(12) United States Patent
Hurd

(10) Patent No.: US 9,218,045 B2
(45) Date of Patent: Dec. 22, 2015

(54) OPERATING PROCESSOR ELEMENT BASED ON MAXIMUM SUSTAINABLE DYNAMIC CAPACITANCE ASSOCIATED WITH THE PROCESSOR

(75) Inventor: Linda Hurd, Cool, CA (US)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 13/539,411

(22) Filed: Jun. 30, 2012

(65) Prior Publication Data

US 2014/0006838 A1 Jan. 2, 2014

(51) Int. Cl.
*G06F 1/32* (2006.01)

(52) U.S. Cl.
CPC .............. *G06F 1/324* (2013.01); *Y02B 60/1217* (2013.01)

(58) Field of Classification Search
CPC ......... G06F 1/08; G06F 1/3203; G06F 1/324; G06F 1/3206; G06F 1/3228; G06F 1/3287
USPC ........................................................ 713/501
See application file for complete search history.

(56) References Cited

U.S. PATENT DOCUMENTS

| | | | |
|---|---|---|---|
| 5,953,020 A | 9/1999 | Wang et al. | |
| 7,337,339 B1 | 2/2008 | Choquette et al. | |
| 7,386,737 B2* | 6/2008 | Finkelstein et al. | 713/300 |
| 7,574,613 B2* | 8/2009 | Holle et al. | 713/300 |
| 7,634,668 B2 | 12/2009 | White et al. | |
| 7,664,971 B2 | 2/2010 | Oh | |
| 7,886,164 B1 | 2/2011 | Alben et al. | |
| 8,193,831 B1 | 6/2012 | Kadosh et al. | |
| 8,214,663 B2 | 7/2012 | Floyd et al. | |
| 8,539,269 B2 | 9/2013 | Rotem et al. | |
| 2001/0011356 A1 | 8/2001 | Lee et al. | |
| 2001/0029556 A1 | 10/2001 | Priem et al. | |
| 2003/0007394 A1 | 1/2003 | Phi | |
| 2005/0154931 A1* | 7/2005 | Oh | 713/300 |
| 2006/0047987 A1* | 3/2006 | Prabhakaran et al. | 713/322 |
| 2006/0053326 A1* | 3/2006 | Naveh et al. | 713/323 |
| 2006/0069936 A1* | 3/2006 | Lint et al. | 713/320 |
| 2007/0206683 A1 | 9/2007 | Lin | |
| 2007/0208964 A1* | 9/2007 | Sandon et al. | 713/501 |

(Continued)

FOREIGN PATENT DOCUMENTS

| WO | 2013/101189 A1 | 7/2013 |
|---|---|---|
| WO | 2013/101829 A1 | 7/2013 |

OTHER PUBLICATIONS

Non-Final Office Action received for U.S. Appl. No. 13/077,618, mailed on Dec. 26, 2012, 7 pages.

(Continued)

*Primary Examiner* — Thomas Lee
*Assistant Examiner* — Santosh R Poudel
(74) *Attorney, Agent, or Firm* — Alpine Technology Law Group LLC

(57) ABSTRACT

Methods and apparatus relating to dynamic intelligent allocation and utilization of package maximum operating current budget are described. In one embodiment, at least one computational element may be caused to operate at an increased frequency in response to a determination that an opportunity exists to reduce a maximum dynamic capacitance associated with the processor. The determination may be based on an idle status of one or more subsystems of the processor. Other embodiments are also disclosed and claimed.

26 Claims, 6 Drawing Sheets

(56) References Cited

U.S. PATENT DOCUMENTS

| | | | |
|---|---|---|---|
| 2007/0234075 A1* | 10/2007 | Zimmer et al. | 713/300 |
| 2007/0245165 A1* | 10/2007 | Fung | 713/320 |
| 2008/0001795 A1* | 1/2008 | Arabi et al. | 341/107 |
| 2008/0005592 A1* | 1/2008 | Allarey et al. | 713/300 |
| 2008/0235364 A1 | 9/2008 | Gorbatov et al. | |
| 2008/0244294 A1* | 10/2008 | Allarey | 713/324 |
| 2008/0307248 A1* | 12/2008 | Amano et al. | 713/600 |
| 2009/0204830 A1* | 8/2009 | Frid et al. | 713/322 |
| 2010/0169692 A1 | 7/2010 | Burton | |
| 2010/0218029 A1 | 8/2010 | Floyd et al. | |
| 2010/0274938 A1 | 10/2010 | Anand et al. | |
| 2011/0022871 A1 | 1/2011 | Bouvier et al. | |
| 2011/0093724 A1 | 4/2011 | Park et al. | |
| 2011/0099397 A1* | 4/2011 | Rotem et al. | 713/320 |
| 2011/0138388 A1* | 6/2011 | Wells et al. | 718/100 |
| 2011/0145617 A1* | 6/2011 | Thomson et al. | 713/323 |
| 2011/0154081 A1* | 6/2011 | Allarey | 713/323 |
| 2011/0154348 A1* | 6/2011 | Elnozahy et al. | 718/104 |
| 2011/0161627 A1* | 6/2011 | Song et al. | 712/30 |
| 2011/0173477 A1 | 7/2011 | Asaba | |
| 2011/0238974 A1* | 9/2011 | Wells et al. | 713/100 |
| 2012/0110352 A1* | 5/2012 | Branover et al. | 713/300 |
| 2012/0169746 A1 | 7/2012 | Samson | |
| 2012/0254643 A1* | 10/2012 | Fetzer et al. | 713/320 |
| 2013/0007413 A1* | 1/2013 | Thomson et al. | 712/30 |
| 2013/0097443 A1* | 4/2013 | Li et al. | 713/322 |
| 2013/0275782 A1* | 10/2013 | Svilan et al. | 713/300 |
| 2014/0002467 A1 | 1/2014 | Linda | |
| 2014/0092106 A1 | 4/2014 | Hurd et al. | |
| 2014/0237272 A1* | 8/2014 | Sadowski | 713/320 |
| 2014/0245034 A1 | 8/2014 | Rotem et al. | |

OTHER PUBLICATIONS

Notice of Allowance received for U.S. Appl. No. 13/077,618, mailed on May 30, 2013, 8 pages.
Non-Final Office Action received for U.S. Appl. No. 13/340,129, mailed on Jun. 5, 2014, 15 pages.
Non-Final Office Action received for U.S. Appl. No. 13/340,129, mailed on Dec. 13, 2013, 11 pages.
Non-Final Office Action received for U.S. Appl. No. 13/539,414, mailed on Jul. 16, 2014, 11 pages.
International Preliminary Report on Patentability and Written Opinion received for PCT Patent Application No. PCT/US2011/068120, mailed on Jul. 10, 2014, 6 pages.
International Search Report and Written Opinion received for PCT Patent Application No. PCT/US2011/068120, mailed on Sep. 21, 2012, 9 pages.
International Search Report and Written Opinion received for PCT Patent Application No. PCT/US2012/071653, mailed Apr. 29, 2013, 8 pages.
Office Action received for U.S. Appl. No. 13/539,414, mailed on Nov. 10, 2014.
Notice of Allowance received for U.S. Appl. No. 13/539,414, mailed on Apr. 24, 2015.

* cited by examiner

| Bit: | 7 | 6 | 5 | 4 | 3 | 2 | 1 | 0 | Cdyn_max |
|---|---|---|---|---|---|---|---|---|---|
| Sub-System State Variables | EU | SAM | L3\$ | SC_PB | FF_3D | GT | SC_FF | HDC+DAPR | |
| Cdyn_max (nF) | 11.9 | 4.71 | 2 | 1.6 | 0.9 | 0.8 | 0.6 | 0.3 | 22.808 |

State Examples:

| Idle = 00h | 0 | 0 | 0 | 0 | 0 | 0 | 0 | 0 | 0 |
|---|---|---|---|---|---|---|---|---|---|
| All Subsystems except Sampler Active = BFh = 190 | 1 | 0 | 1 | 1 | 1 | 1 | 1 | 1 | 18.1 |
| All Subsystems Active = FFh | 1 | 1 | 1 | 1 | 1 | 1 | 1 | 1 | 22.8 | <== highest value of Cdyn_max

FIG. 4

OPERATING PROCESSOR ELEMENT BASED ON MAXIMUM SUSTAINABLE DYNAMIC CAPACITANCE ASSOCIATED WITH THE PROCESSOR

FIELD

The present disclosure generally relates to the field of electronics. More particularly, an embodiment of the invention relates to dynamic intelligent allocation and utilization of package maximum operating current budget.

BACKGROUND

Generally, the maximum operating current budget of a device (such as a CPU (Central Processing Unit)) is determined by the worse case workload that the device may handle at any time, sometimes referred to as "power virus". Without a protection mechanism, this maximum current may negatively impact chip, package, and system power delivery design.

For example, modern CPU and GPU (Graphics Processing Unit) architectures may implement new functional blocks such as vector operation or accelerator hardware that increase the dynamic range of the power/current and allow much higher power and current "power viruses". This increased "power virus" current may have a severe impact on the design due to a need for higher voltage to compensate for the I*R (where "I" stands for current and "R" stands for resistance) droop which may in turn cause waste of power (i.e., power consumption increases as the voltage guard-bands increase).

There may also be a negative impact on reliability (i.e., the need for higher voltage to compensate for the I*R droop increases voltage levels and reduces device life). Lower turbo frequency may be achieved since the highest operation point (e.g., when all cores in a processor are working) is determined by the maximum current needed for worse current "power virus". Further, package and power delivery costs may be increased because additional capacitors and better voltage regulators may be needed to supply the higher current. Additionally, the system power delivery capabilities may need to be increased in other components such as the battery and/or a power supply.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 4 illustrates a sample table with capacitance values for various subsystems status states, according to an embodiment.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

As processor die (e.g., including both a general-purpose CPU and a GPU) become larger (e.g., to include more functionality such as processing power, storage, etc.), more product SKUs (Stock Keeping Units) may become maximum operating current (Icc_max) limited during different turbo scenarios compared to previous designs, for example, depending on workload characteristics (and how those workloads are dynamically partitioned across multiple CPU cores and/or GPU cores) in those timeframes. Generally, a turbo operation (also referred to as turbo boost) allows processor core(s) to run faster than the base operating frequency (for a period of time) if they are operating below power, current, and temperature specification limits.

Some of the embodiments discussed herein may provide efficient and/or flexible power management for computing systems and/or processors, e.g., via dynamic/intelligent allocation and utilization of a semiconductor package's maximum operating current budget (also referred to herein as "Icc_max"). An embodiment allows for potential performance improvement (such as frequency bin gain) for GPU (or Graphic Effect (GFX)) turbo and/or CPU turbo (e.g., when GFX is active) operations in SKUs which are package Icc_max limited. Generally, a turbo operation allows processor core(s) to run faster than the base operating frequency (for a period of time) if they are operating below power, current, and temperature specification limits.

In one embodiment, the package Icc_max budget may be intelligently allocated and/or utilized by treating graphics maximum dynamic capacitance (Cdyn_max) as being variable in a dynamic sense. This in turn allows for opportunistically improving performance, e.g., by increasing frequency based on a determination that an opportunity is present.

Figure 1:
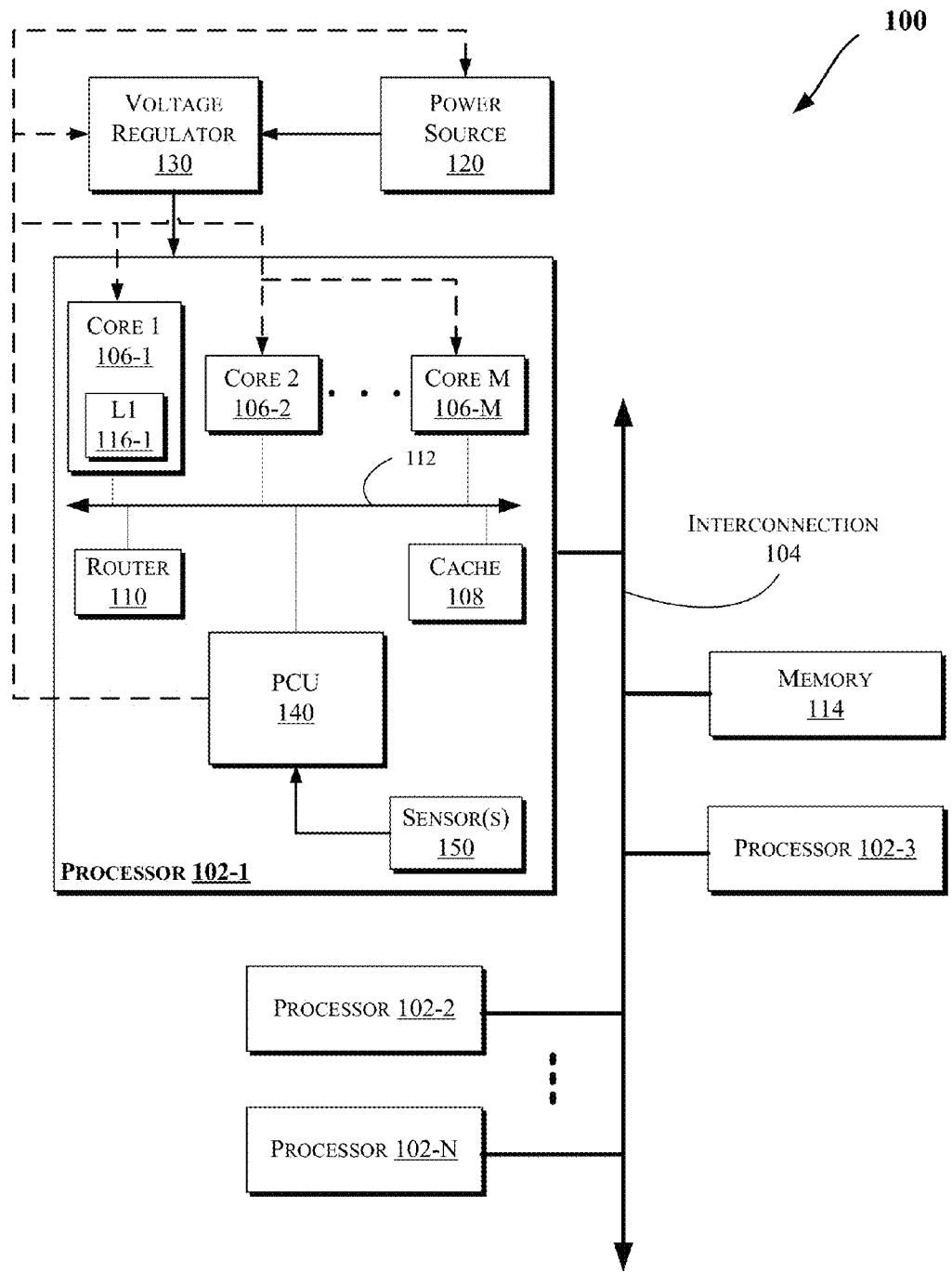
FIGS. 1, 5, and 6 illustrate block diagrams of embodiments of computing systems, which may be utilized to implement various embodiments discussed herein.

Moreover, some embodiments may be applied in computing systems that include one or more processors (e.g., with one or more processor cores), such as those discussed with reference to FIGS. 1-6, including for example mobile computing devices such as smart phones, tablets, portable game consoles, etc.). More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may be general-purpose CPUs and/or GPUs in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 5-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a power source 120 (e.g., a direct current (DC) power source or an alternating current (AC) power source) to provide power to one or more components of the system 100. In some embodiments, the power source 120 may include one or more battery packs and/or power supplies. The power source 120 may be coupled to components of system 100 through a voltage regulator (VR) 130. Moreover, even though FIG. 1 illustrates one power source 120 and one voltage regulator 130, additional power sources and/or voltage regulators may be utilized. For example, each of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores). Power source may be capable of driving variable voltage or have different power drive configurations.

Additionally, while FIG. 1 illustrates the power source 120 and the voltage regulator 130 as separate components, the power source 120 and the voltage regulator 130 may be integrated and/or incorporated into other components of system 100. For example, all or portions of the VR 130 may be incorporated into the power source 120 and/or processor 102. Furthermore, as shown in FIG. 1, the power source 120 and/or the voltage regulator 130 may communicate with the power control logic 140 and report their power specification.

As shown in FIG. 1, the processor 102 may further include a Power Control Unit (PCU) logic 140 to control supply of power to components of the processor 102 (e.g., cores 106). Logic 140 may have access to one or more storage devices discussed herein (such as cache 108, L1 cache 116, memory 114, register(s), or another memory in system 100) to store information relating to operations of the PCU logic 140 such as information communicated with various components of system 100 as discussed here. As shown, the logic 140 may be coupled to the VR 130 and/or other components of system 100 such as the cores 106 and/or the power source 120. For example, the PCU logic 140 may be coupled to receive information (e.g., in the form of one or more bits or signals) to indicate status of one or more sensors 150 (where the sensor(s) 150 may be located proximate to components of system 100 (or other computing systems discussed herein such as those discussed with reference to other figures including 5 and 6, for example), such as the cores 106, interconnections 104 or 112, etc., to sense variations in various factors affecting power/thermal behavior of the system, such as temperature, operating frequency, operating voltage, operating current, dynamic capacitance, power consumption, inter-core communication activity, etc.). For example, the sensors 150 may detect whether one or more subsystems are active (e.g., as discussed with reference to FIGS. 2-4). The logic 140 may in turn instruct the VR 130, power source 120, and/or individual components of system 100 (such as the cores 106) to modify their operations. For example, logic 140 may indicate to the VR 130 and/or power source 120 to adjust their output. In some embodiments, logic 140 may request the cores 106 to modify their operating frequency, power consumption, dynamic capacitance, operating current, etc. Also, even though components 140 and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, etc. Also, even though cores 106 are shown to be processor cores, these can be other computational element such as graphics cores, special function devices, etc.

In some current implementations, graphics Cdyn_max definition may be generally based on a maximum sustainable Cdyn (dynamic capacitance) across a defined window (such as, 1 μsec). The dynamic component of Icc_max is Cdyn_max*V*F (where "V" stands for voltage, and "F" stands for frequency). Further, graphics Cdyn_max may be treated as a constant value independent of workload, for example, the highest average Cdyn that can be sustained across a 1 μsec time window.

Moreover, Cdyn_max terminology originated from general-purpose CPU core world which is an architecture/machine capable of sustaining the Cdyn_max over a long period of time. However, GPU architecture is relatively more complex; namely, the max sustainable Cdyn for 1 μsec may be a different value than that for 100 μsec or 2 μsec based on the complexity of the different subsystems, latencies, and interactions between these subsystems in the GPU core, for example.

In some embodiments, Cdyn_max is not a static constant and is variable/dynamic for most graphics frames. This is because different drawcalls may take different paths through the graphics engine. For example, a drawcall performing vertex shading that does not use sampler takes a different path than a drawcall performing a pixel shader which does use sampler. Generally, a sampler (also known as "3D Texture Sampler" sometimes) refers to logic for performing texture filtering (or smoothing) to determine the texture color for a texture-mapped-pixel using the colors of nearby texls (pixels of the texture). The texturing process allows a texture to be applied at many different shapes, sizes, and angles, while minimizing blurriness, shimmering and blocking. Another example is a GPU workload, which does not utilize the sampler, does not have potential for as high of a Cdyn_max as one that does. An embodiment, leverages off of the variable Cdyn_max observation for opportunistically improving performance for SKUs which have Icc_max limitation, by intelligently enabling gain of frequency bin(s) during turbo operation when such opportunity exists. By contrast, the package Icc_max is a fixed value for a SKU in current implementations.

Figure 2:
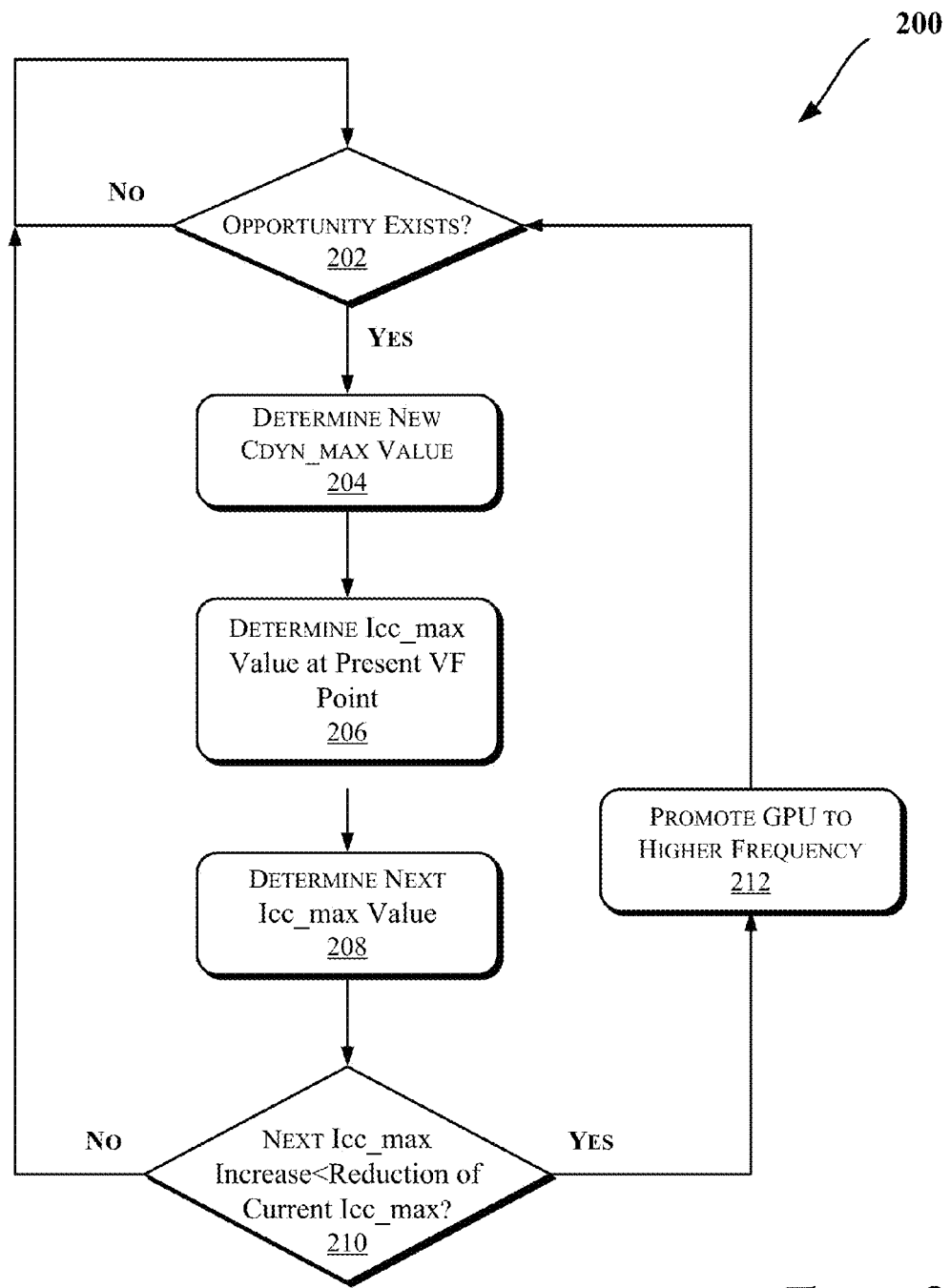
FIG. 2 illustrates a flow diagram of a method to provide dynamic intelligent allocation and utilization of a semiconductor package maximum operating current budget, according to an embodiment.

FIG. 2 illustrates a flow diagram of a method 200 to provide dynamic intelligent allocation and utilization of a semiconductor package maximum operating current budget, according to an embodiment. In an embodiment, various components discussed with reference to FIGS. 1 and 5-6 may be utilized to perform one or more of the operations discussed with reference to FIG. 2.

Referring to FIGS. 1-2, at an operation 202, it is determined (e.g., by logic 140 based on information from sensor(s) 150) when opportunity exists to lower Cdyn_max based on which subsystems are idle (e.g., some minimum/threshold time window may be predefined and compared to qualify/determine the duration of the opportunity—for example, that the duration of the opportunity is greater than or equal to the minimum/threshold time window in an embodiment). At an operation 204, the new (lower) Cdyn_max value is determined.

At an operation 206, the resulting reduction in a dynamic component of GPU Icc_max at present VF (Voltage, Frequency) operating point is determined. At an operation 208, the increase in dynamic and leakage components of Icc_max at next highest VF pair is determined. At an operation 210, it is determined if the increase in Icc_max at next highest VF pair is less than reduction of dynamic component of Icc_max at present VF pair. If so, at an operation 212, the graphics logic (e.g., GPU) may be promoted to the higher frequency (if no other limit occurs); otherwise, the graphics logic continues to operate at its current frequency. Also, in some embodiments, similar calculations/determinations may be done for general-purpose core(s) to determine if the reduction of dynamic component of Icc_max at present VF pair may be utilized by these core(s) to enter turbo to next highest frequency bin. In accordance with various embodiments, the PCU logic 140 and/or a dedicated logic may perform the determinations/calculations in one or more of the operations 202-210.

Moreover, the parametrics for graphics (such as leakage versus voltage and/or leakage versus temperature lookup tables) and same types of parametrics for the rest of die may be caused to be stored by hardware or software, or combinations thereof. Values associated with the Cdyn_max contribution per graphics subsystem may also be stored.

In some embodiments, for Graphics Core, subsystems may be defined as one or more of: (1) GTI (which, as discussed herein, may refer to Graphics Transfer Interface, Graphics Transmission Interface, or Global Transfer Interface interchangeably); (2) one or more Fixed Functions (also referred to as "FF" herein, such as CS (Command Streamer), VF (Vertex Fetch), VS (Vertex Shader), GS (Geometry Shader), TE (Tesselator), DS (Domain Shader), HS (Hull Shader), SOL (Stream Out), CL (Clipper), SF (Setup (aka, Strip and Fan)), TDG (Thread Dispatcher Global), VFE (Video Front End), and/or TSG (Thread Spawner Global)); (3) Slice Common (SC) front end (e.g., including WM (Window Manager), IZ (Intermediate Z), HZ (High Z), SBE (Setup Back End), STC (Stencil Cache), RCZ (Render Cache Z)) complex of unit(s); (4) SC back end (e.g., including RCC (Render Cache Color), DAPR BE (Data Port Back End), MSC (Multi Sample Cache), RCPBFE (Front End of Render Color-Pixel Blend), RCPBBE (Back End of Render Color-Pixel Blend), IECP (Image Enhancement Color Processing (Media)) complex of Unit(s); (5) L3$ (Third Level cache); (6) EUs (Execution Units), L1 Instruction Cache(s), Message Arbiter, Thread Dispatcher Local, Pixel Shader Dispatcher, and/or BariCentric unit(s); (7) one or more Samplers (also referred to herein as "SAM"); and/or (8) HDC (Half-slice Data Cluster) plus DAPRFE (Front End of the Data Port). When any of these is active, each contribute unique values of Cdyn_max to the total Cdyn_max.

Figure 3:
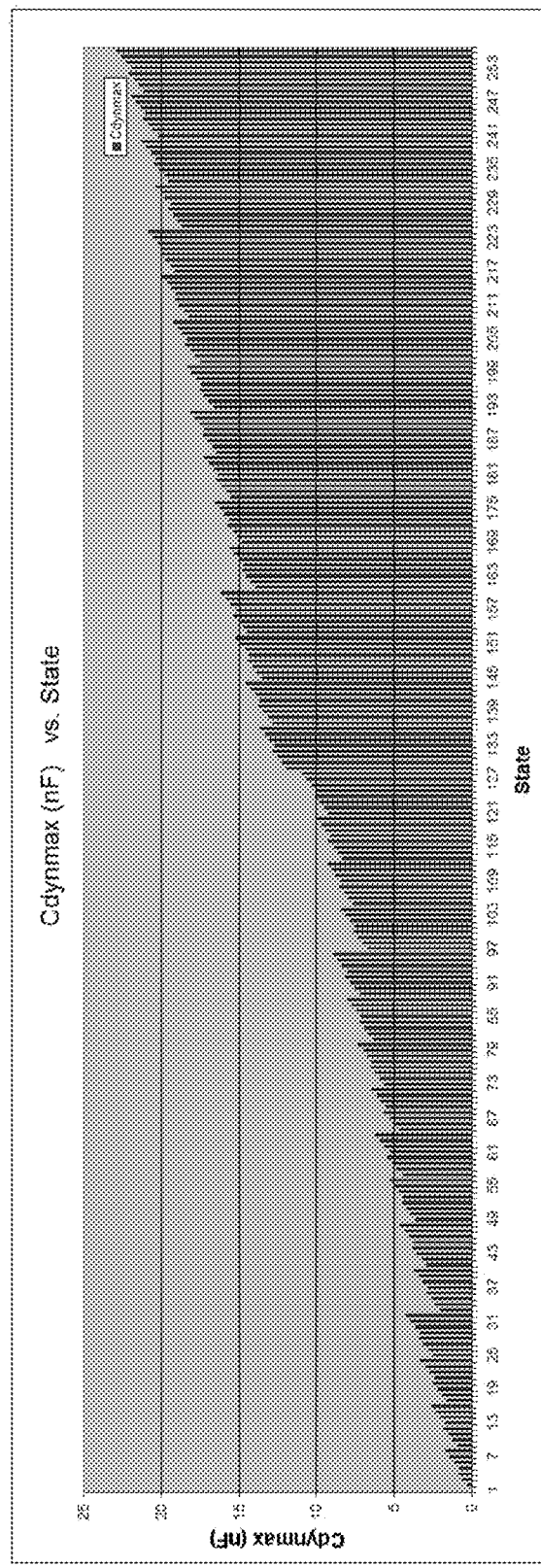
FIG. 3 illustrates a bar graph of a sample continuum of capacitance values for the 256 possible combinations, according to an embodiment.

FIG. 3 illustrates a bar graph of a sample continuum of Cdyn_max values for the 256 possible combinations, according to an embodiment. FIG. 4 illustrates a sample table with Cdyn_max values for various subsystems status states, according to an embodiment.

As discussed herein, the state variable is 0 if the subsystem is idle and 1 if the Subsystem is Active (where Active refers to Active Not Stalled plus Active Stalled in an embodiment). Of course, the 0/1 designation may be reversed depending on the implementation. The nonlinear dynamic system has 256 unique states. Each of these states has an associated Cdyn_max value (based upon a time window definition). There may be more than one time window definition. In an embodiment, each time window definition may have an associated Cdyn_max. Also, for a given frame, not all 256 possible states may occur. In Symbolic Dynamics (e.g., based on Shannon Entropy), those states which do not occur are called Forbidden Words (where "Words" is a term for States). Symbolic Dynamics may be multi-dimensional in some embodiments.

As shown in FIG. 4 and discussed with reference to FIG. 2, some embodiments identify when an opportunity exists to lower Cdyn_max based on which subsystems are idle. For example, a driver (e.g., general-purpose) processor core may be able to detect when a drawcall within a frame or an entire workload such as a GPU does not utilize a sampler. Another option would be to have internal detection within graphics hardware. If it is determined the increase in Icc_max at the next highest VF pair is less than reduction of dynamic component of Icc_max at present VF pair, the graphics logic (e.g., GPU) may be promoted to the higher frequency (if no other limit occurs). Also, in some embodiments, similar calculations/determinations may be done for general-purpose core (s) to determine if the reduction of dynamic component of Icc_max at present VF pair may be utilized by these core(s) to enter turbo to next highest frequency bin.

Figure 5:
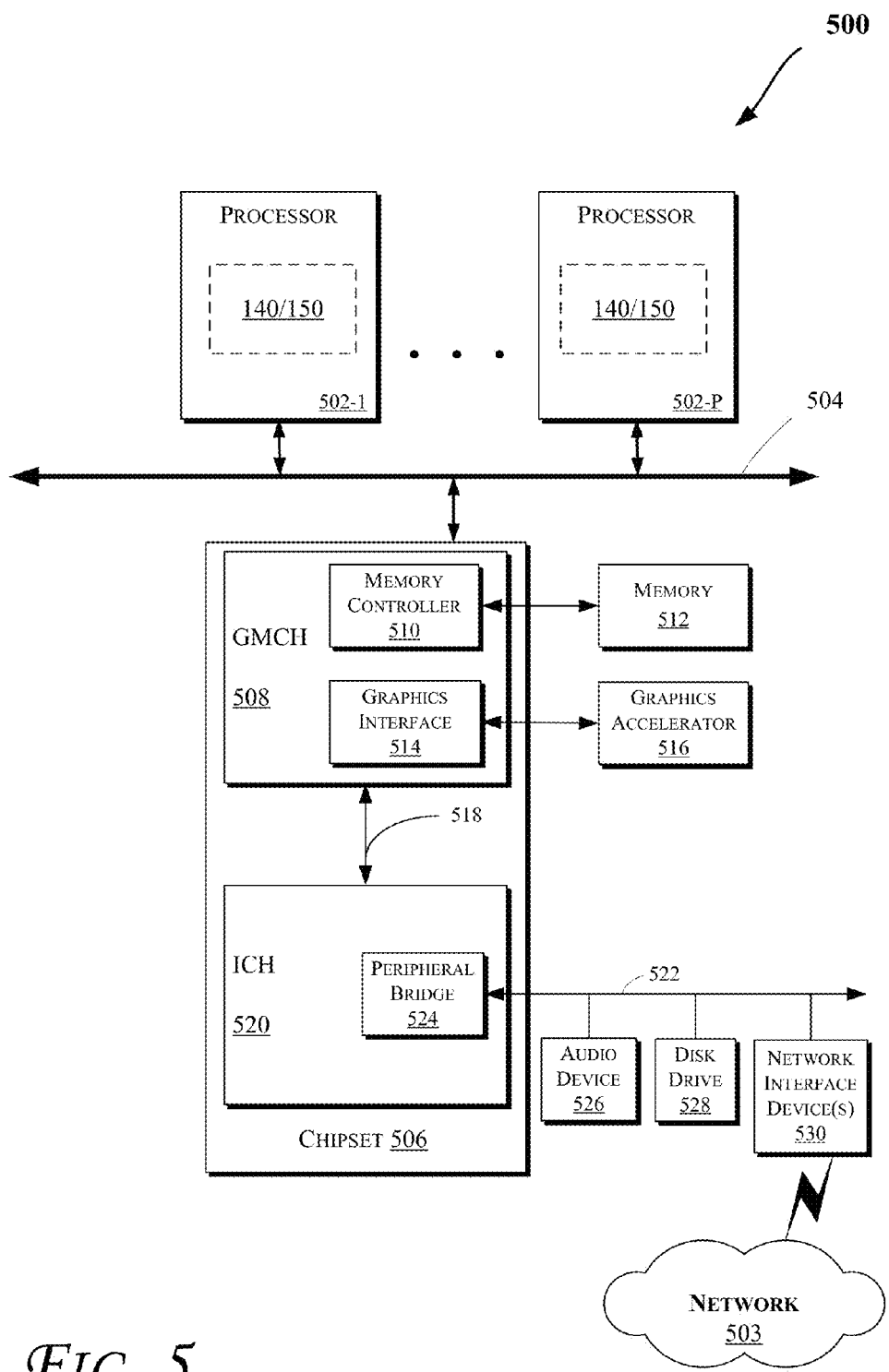

FIG. 5 illustrates a block diagram of a computing system 500 in accordance with an embodiment of the invention. The computing system 500 may include one or more central processing unit(s) (CPUs) or processors 502-1 through 502-P (which may be referred to herein as "processors 502" or "processor 502"). The processors 502 may communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. In some embodiments, one or more of the processors 502 may include one or more of the cores 106, logic 140, sensor(s) 150, of FIG. 1. Also, the operations discussed with reference to FIGS. 1-4 may be performed by one or more components of the system 500. For example, a voltage regulator (such as VR 130 of FIG. 1) may regulate voltage supplied to one or more components of FIG. 5 at the direction of logic 140.

A chipset 506 may also communicate with the interconnection network 504. The chipset 506 may include a graphics and memory control hub (GMCH) 508. The GMCH 508 may include a memory controller 510 that communicates with a memory 512. The memory 512 may store data, including sequences of instructions that are executed by the processor 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a graphics accelerator 516. In one embodiment of the invention, the graphics interface 514 may communicate with the graphics accelerator 516 via an accelerated graphics port (AGP). In an embodiment of the invention, a display (such as a flat panel display, a cathode ray tube (CRT), a projection screen, etc.) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the processor 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and one or more network interface device(s) 530 (which is in communication with the computer network 503). Other devices may communicate via the bus 522. Also, various components (such as the network interface device 530) may communicate with the GMCH 508 in some embodiments of the invention. In addition, the processor 502 and the GMCH 508 may be combined to form a single chip. Furthermore, the graphics accelerator 516 may be included within the GMCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration. For example, processors, memory, and/or input/output devices may be interconnected by a number of point-to-point interfaces.

Figure 6:
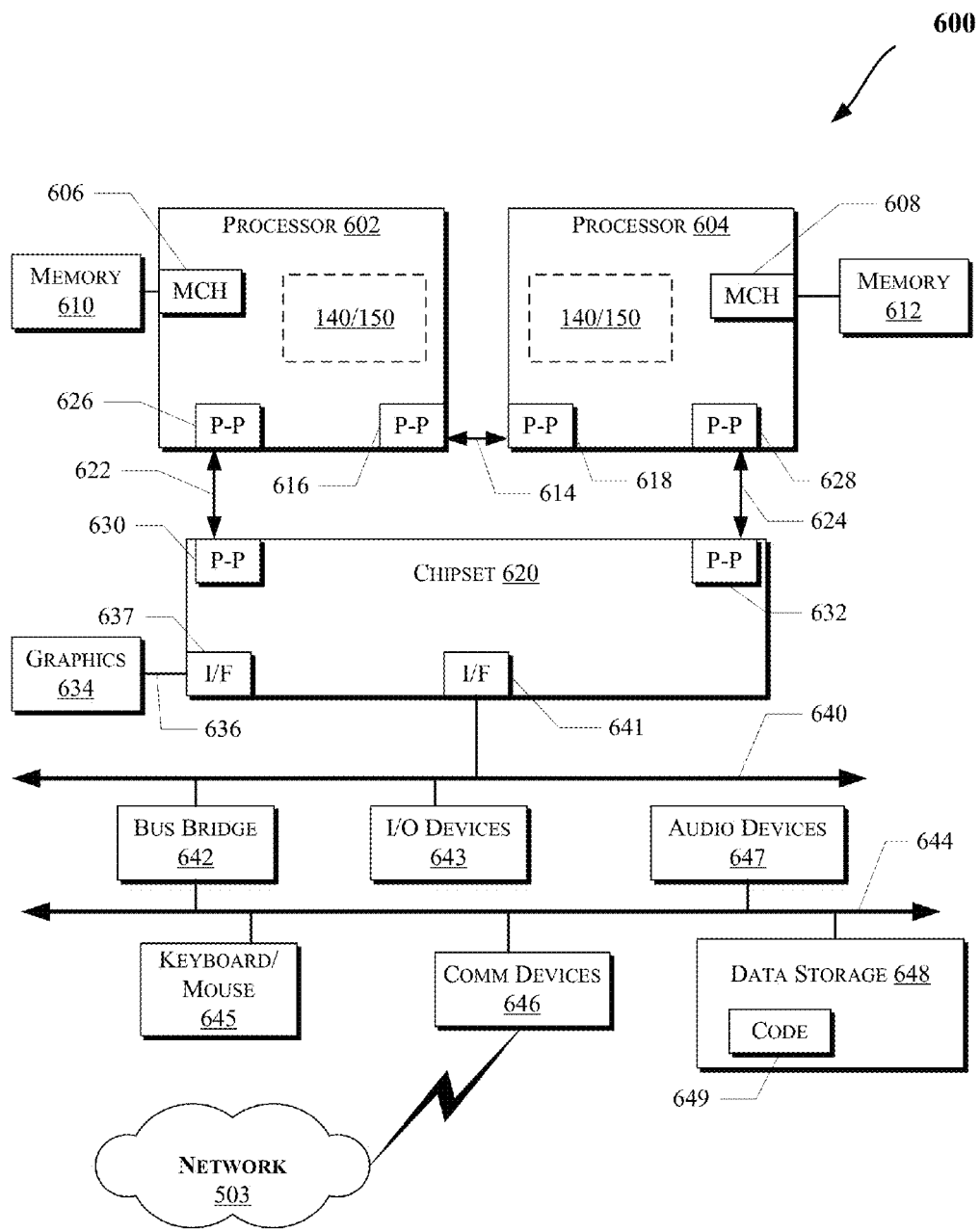

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600. For example, a voltage regulator (such as VR 130 of FIG. 1) may regulate voltage supplied to one or more components of FIG. 6.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5. Also, the processors 602 and 604 may include one or more of the cores 106, logic 140, and/or sensor(s) 150 of FIG. 1.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

In at least one embodiment, one or more operations discussed with reference to FIGS. 1-6 may be performed by the processors 602 or 604 and/or other components of the system 600 such as those communicating via a bus 640. Other embodiments of the invention, however, may exist in other circuits, logic units, or devices within the system 600 of FIG. 6. Furthermore, some embodiments of the invention may be distributed throughout several circuits, logic units, or devices illustrated in FIG. 6.

Chipset 620 may communicate with the bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
   at least one computational element; and
   logic to cause the at least one computational element to operate at an increased frequency in response to a determination that an opportunity exists to reduce a dynamic capacitance associated with the processor,
   wherein the determination is to be based on an idle status of one or more subsystems of the processor, wherein the determination is to be made in response to a comparison of an increase in an operating current at a next higher Voltage, Frequency (VF) pair with a reduction of a dynamic component of the operating current at a present VF pair, wherein the dynamic component of the operating current at the present VF pair is to be determined at least partially based on a maximum sustainable dynamic capacitance across a window of time.

2. The processor of claim 1, wherein the logic is to cause the at least one computational element to operate at the increased frequency in response to a comparison of a duration of the opportunity with a threshold time window.

3. The processor of claim 1, wherein the subsystems are selected from one or more of: Graphics Transmission Interface (GTI), one or more Fixed Functions, Slice Common (SC) front end, SC back end, Third Level cache, one or more Execution Units, one or more Samplers, or Half-slice Data Cluster plus Front End of the Data Port.

4. The processor of claim 1, wherein the dynamic capacitance is to correspond to a semiconductor package comprising the processor.

5. The processor of claim 1, wherein the determination is to be based on information from one or more sensors.

6. The processor of claim 1, wherein the at least one computational element is to comprise a graphics computational element or a general-purpose computational element.

7. The processor of claim 1, wherein the at least one computational element is to comprise one or more processor cores.

8. The processor of claim 1, further comprising one or more sensors to detect variations, corresponding to components of the processor, in one or more of: temperature, operating frequency, operating voltage, operating current, dynamic capacitance, power consumption, or inter-core communication activity.

9. The processor of claim 1, wherein one or more of a plurality of computational elements, the logic, a voltage regulator, or a memory are on a single integrated circuit die.

10. A method comprising:
    determining whether an opportunity exists to reduce a dynamic capacitance associated with a processor having at least one computational element; and
    causing the at least one computational element to operate at an increased frequency in response to the determination that the opportunity exists to reduce the dynamic capacitance associated with the processor,
    wherein the determination is based on an idle status of one or more subsystems of the processor, wherein the determination is made in response to a comparison of an increase in an operating current at a next higher Voltage, Frequency (VF) pair with a reduction of a dynamic component of the operating current at a present VF pair, wherein the dynamic component of the operating current at the present VF pair is determined at least partially based on a maximum sustainable dynamic capacitance across a window of time.

11. The method of claim 10, further comprising determining a duration of the opportunity.

12. The method of claim 11, further comprising comparing the determined duration of the opportunity with a threshold time window.

13. The method of claim 10, wherein the subsystems are selected from one or more of: Graphics Transmission Interface (GTI), one or more Fixed Functions, Slice Common (SC) front end, SC back end, Third Level cache, one or more Execution Units, one or more Samplers, or Half-slice Data Cluster plus Front End of the Data Port.

14. The method of claim 10, wherein the dynamic capacitance corresponds to a semiconductor package comprising the processor.

15. The method of claim 10, further comprising making the determination based on information from one or more sensors.

16. The method of claim 10, wherein the at least one computational element comprises a graphics computational element or a general-purpose computational element.

17. The method of claim 10, further comprising detecting variations by one or more sensors, corresponding to components of the processor, in one or more of: temperature, operating frequency, operating voltage, operating current, dynamic capacitance, power consumption, or inter-core communication activity.

18. A system comprising:
    a processor having at least one computational element and logic to cause the at least one computational element to operate at an increased frequency in response to a determination that an opportunity exists to reduce a dynamic capacitance associated with the processor,
    wherein the determination is to be based on an idle status of one or more subsystems of the processor, wherein the determination is to be made in response to a comparison of an increase in an operating current at a next higher Voltage, Frequency (VF) pair with a reduction of a dynamic component of the operating current at a present VF pair, wherein the dynamic component of the operating current at the present VF pair is to be determined at least partially based on a maximum sustainable dynamic capacitance across a window of time.

19. The system of claim 18, wherein the logic is to cause the at least one computational element to operate at the increased frequency in response to a comparison of a duration of the opportunity with a threshold time window.

20. The system of claim 18, wherein the subsystems are selected from one or more of: Graphics Transmission Interface (GTI), one or more Fixed Functions, Slice Common (SC) front end, SC back end, Third Level cache, one or more Execution Units, one or more Samplers, or Half-slice Data Cluster plus Front End of the Data Port.

21. The system of claim 18, wherein the at least one computational element is to comprise a graphics computational element or a general-purpose computational element.

22. The system of claim 18, wherein the at least one computational element is to comprise one or more processor cores.

23. A non-transitory computer-readable medium comprising one or more instructions that when executed on a processor configure the processor to perform one or more operations to:
   determine whether an opportunity exists to reduce a dynamic capacitance associated with a processor having at least one computational element; and
   cause the at least one computational element to operate at an increased frequency in response to the determination that the opportunity exists to reduce the dynamic capacitance associated with the processor,
   wherein the determination is based on an idle status of one or more subsystems of the processor, wherein the determination is to be made in response to a comparison of an increase in an operating current at a next higher Voltage, Frequency (VF) pair with a reduction of a dynamic component of the operating current at a present VF pair, wherein the dynamic component of the operating current at the present VF pair is to be determined at least partially based on a maximum sustainable dynamic capacitance across a window of time.

24. The non-transitory computer-readable medium of claim 23, further comprising one or more instructions that when executed on a processor configure the processor to perform one or more operations to determine a duration of the opportunity and to compare the determined duration of the opportunity with a threshold time window.

25. The non-transitory computer-readable medium of claim 23, further comprising one or more instructions that when executed on a processor configure the processor to perform one or more operations to make the determination based on information from one or more sensors.

26. The non-transitory computer-readable medium of claim 23, further comprising one or more instructions that when executed on a processor configure the processor to perform one or more operations to detect variations by one or more sensors, corresponding to components of the processor, in one or more of: temperature, operating frequency, operating voltage, operating current, dynamic capacitance, power consumption, or inter-core communication activity.

\* \* \* \* \*